(12) United States Patent
Yoshimura

(10) Patent No.: US 6,603,277 B2
(45) Date of Patent: Aug. 5, 2003

(54) APPARATUS FOR CONTROLLING COOLING FAN FOR VEHICLE

(75) Inventor: Satoshi Yoshimura, Kariya (JP)

(73) Assignee: Denso Corporation, Kariya (JP)

( * ) Notice: Subject to any disclaimer, the term of this patent is extended or adjusted under 35 U.S.C. 154(b) by 47 days.

(21) Appl. No.: 09/933,740

(22) Filed: Aug. 22, 2001

(65) Prior Publication Data
US 2002/0043946 A1 Apr. 18, 2002

(30) Foreign Application Priority Data
Aug. 23, 2000 (JP) ........................... 2000-252419

(51) Int. Cl.⁷ ............................. H02P 1/00; H02P 3/00; H02P 5/00
(52) U.S. Cl. .................... 318/139; 318/140; 318/153
(58) Field of Search .................. 318/139–140, 318/146, 153, 254, 280–282, 286, 439

(56) References Cited

U.S. PATENT DOCUMENTS 4,409,933 A * 10/1983 Inoue ........................ 318/471
5,828,192 A * 10/1998 Kawaguchi et al. ........ 318/139

FOREIGN PATENT DOCUMENTS

| JP | 56-141530 | 3/1980 |
| JP | 58-18016 | 7/1981 |
| JP | 2-26723 | 2/1990 |
| JP | 3-5657 | 1/1991 |
| JP | 5-26039 | 2/1993 |
| JP | 2000-18036 | 1/2000 |

OTHER PUBLICATIONS

U.S. patent application Ser. No. 09/832,991, Yoshimura, filed Apr. 12, 2001.
U.S. patent application Ser. No. 09/915,259, Yoshimura, filed Jul. 27, 2001.

* cited by examiner

Primary Examiner—Marlon T. Fletcher
(74) Attorney, Agent, or Firm—Law Offices of David G. Posz

(57) ABSTRACT

A cooling fan control circuit drives a brushless motor to rotate a cooling fan to cool a condenser and a radiator mounted on a vehicle when a drive signal is activated. In a situation where the brushless motor rotates at a rotational speed equal to or higher than a predetermined value by flowing air in a situation that the drive signal is not activated and a charge state signal indicating that a battery is not in a fully charged state, the control circuit turns off MOSFETs in upper arms of an inverter circuit and simultaneously, synchronously switches MOSFETs in lower arms of the inverter circuit. With this configuration, an electric energy generated by the flowing air is stored from the brushless motor to a battery.

10 Claims, 9 Drawing Sheets

APPARATUS FOR CONTROLLING COOLING FAN FOR VEHICLE

CROSS REFERENCE TO RELATED APPLICATION

This application is based upon Japanese Patent Application No. 2000-252419 filed on Aug. 23, 2000, the contents of which are incorporated herein by reference.

BACKGROUND OF THE INVENTION

1. Field of the Invention

The present invention relates to an apparatus for controlling a motor-driven cooling fan for a vehicle.

2. Related Art

A vehicle (for example, automobile) is provided with a cooling fan for cooling a radiator of an engine, a condenser of an air conditioner, and the like. Conventionally, the cooling fan is driven by a DC motor (with a brush). By using the cooling system, different from the configuration of coupling the cooling fan to the output shaft of the engine and rotating the fan by the engine, the cooling fan can be driven and stopped directly by the motor, and its rotational speed can be set independent of the rotating state of the engine.

However, since the motor for rotating the cooling fan is driven on the power supplied from a battery, as compared with the case where the cooling fan is driven by the engine, the balance between charging and discharging of the battery, that is, the balance between generated power and consumed power in a vehicle deteriorates. In recent years, therefore, a technique of using a brushless motor having higher motor efficiency in place of a DC motor (with a brush) has been proposed. In this case as well, it is difficult to largely reduce the power consumed to rotate the cooling fan.

SUMMARY OF THE INVENTION

The invention has been achieved in consideration of the circumstances and its object is to provide an apparatus for controlling a motor-driven cooling fan for a vehicle, capable of achieving an improved power balance.

According to first aspect of the invention, when a vehicle travels, a flowing air passes through a cooling fan for vehicle, and the cooling fan for vehicle is rotated by the traveled flowing air. Thus, a motor works as a regenerative apparatus which generates energy in association with the rotation of the cooling fan (motor). As a result, a battery is regenerated in electric power. Consequently, even when the cooling fan for vehicle is driven by a motor, a relationship between consumed power and generated power (hereinafter, power balance) in the vehicle can be improved. Particularly, in the case of a vehicle, different from a device receiving natural wind, as the vehicle travels, the flowing air passes through the vehicle at relatively high speed. Consequently, the rotating energy of the cooling fan for vehicle by the flowing air is large, and the large regenerative energy can be therefore obtained. Therefore, the power is prevented from being consumed largely.

When the rotational speed detected by the rotational speed detecting means is equal to or higher than a predetermined value, the regenerative apparatus regenerates the energy by the motor. Consequently, only when a regenerative energy of a certain quantity is expected, that is, only when the power balance in the vehicle is effectively improved, the regenerating operation can be executed.

According to the invention, the regenerative apparatus stores (charges) the energy which is generated by the motor into power storing means (such as the battery). Even in the case where the generated energy to be regenerated changes every moment according to a change in the driving state of the vehicle such as a vehicle speed, regenerated energy can be effectively used. Since the regenerative apparatus stores (charges) the energy in a situation that the power storing means is not in a fully stored state, occurrence of an excessively stored state in the power storing means can be prevented.

According to the invention, in a case where the cooling fan for vehicle is rotated by a flowing air as the vehicle travels, a driving apparatus generates energy by using the motor in association with the rotation of the fan (motor). Even in the configuration of driving the cooling fan for vehicle by a motor, the electric power balance of the energy storing means in the vehicle can be improved. Further, since the driving apparatus for driving the motor has a function of generating energy so as to regenerate the energy of the energy storing means such as a battery, the configuration is simpler as compared with a configuration of separately providing the regenerative apparatus.

According to other aspect of the invention, a brushless motor having relatively high motor efficiency is used as the motor for rotating the cooling fan for vehicle. Thus, further improved power balance in the vehicle can be obtained.

According to other aspect of the invention, when an instruction of driving the cooling fan for vehicle is input, a control circuit outputs a drive signal for driving a brushless motor to a switching device constituting an inverter circuit. Moreover, the control circuit outputs a regenerative drive signal for regenerating the energy by the brushless motor when the drive signal is not output.

According to other aspect of the invention, the control circuit supplies an off signal to a switching device constituting an upper arm of an inverter circuit having a bridge circuit configuration, and supplies a switching signal having a predetermined frequency and a predetermined duty ratio to a switching device constituting a lower arm. With the configuration, voltage boosting operation and regenerating operation are simultaneously executed.

Specifically, when the lower arm switching device is turned on, a current flows in a stator winding via the lower arm switching device by an inductive voltage of the brushless motor. When the lower arm switching device is turned off, the current is returned to the input side of the inverter circuit via a flywheel diode disposed on the upper arm side. According to the means, even when the rotational speed, that is, the inductive voltage of the brushless motor is low, the inductive voltage can be regenerated while being boosted.

Other features and advantages of the present invention will become more apparent from the following detailed description made with reference to the accompanying drawings.

DETAILED DESCRIPTION OF THE PREFERRED EMBODIMENTS

Figure 1:
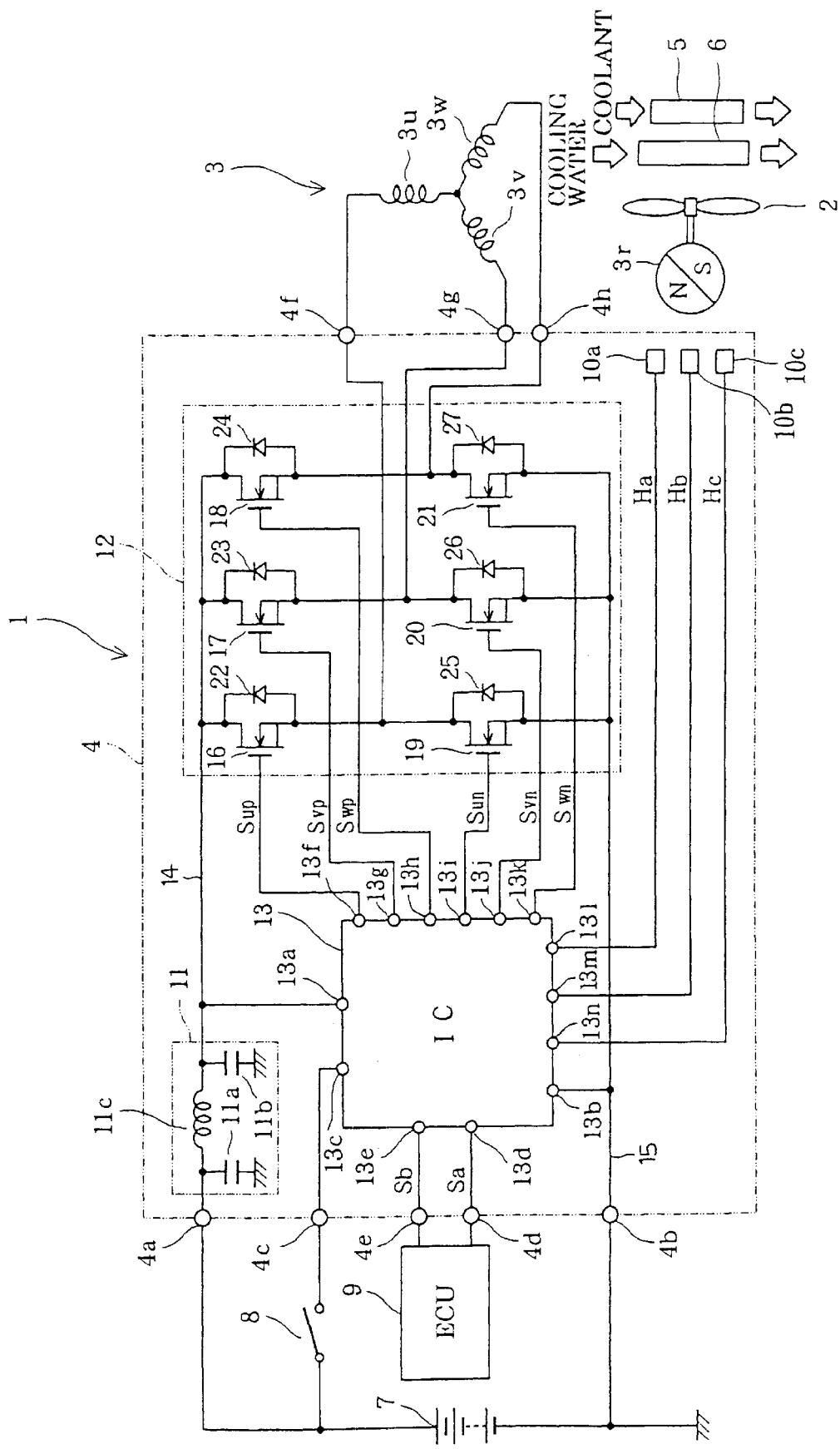
FIG. 1 is a diagram showing an electric configuration of a fan controlling apparatus according to an embodiment of the invention.

Specific embodiments of the present invention will now be described hereinafter with reference to the accompanying drawings in which the same or similar component parts are designated by the same or similar reference numerals.

Referring to FIG. 1, a fan controlling apparatus 1 is constructed in such a manner that a brushless motor 3 for rotating a cooling fan 2 (corresponding to a cooling fan for a vehicle) and a driving circuit 4 (corresponding to a driving apparatus) formed on a substrate, for controlling the brushless motor 3 are housed in a not-illustrated housing.

The cooling fan 2 is used to cool a condenser 5 through which a refrigerant of an air conditioner for the vehicle passes and a radiator 6 through which an engine cooling water passes. The fan controlling apparatus 1, cooling fan 2, condenser 5, and radiator 6 are disposed in the front portion of the vehicle. Consequently, when the vehicle travels, flowing air flowing into the vehicle from the front passes through the condenser 5 and then the radiator 6, thereby contributing to cool them. After that, the flowing air is supplied to the cooling fan 2.

Power source terminals 4a and 4b of the driving circuit 4 are respectively connected to a positive-side terminal and a negative-side terminal (earth terminal) of a battery 7 (corresponding to power storing means) mounted on the vehicle. An input terminal 4c of the driving circuit 4 is connected to the positive-side terminal of the battery 7 via an ignition (IG) switch 8. To input terminals 4d and 4e of the driving circuit 4, a control signal Sa for instructing rotational speed of the brushless motor 3 (that is, cooling fan 2) and a charging state signal Sb indicating whether the battery 7 is in a full charge state or not are input from an engine control unit 9 provided on the outside of the fan controlling apparatus 1.

The brushless motor 3 has, for example, a three-phase six-pole structure and includes a stator (not shown) around which windings 3u, 3v, and 3w are wound and a rotor 3r in which a permanent magnet is disposed (two-pole structure is shown in FIG. 1). The cooling fan 2 is attached to the rotary shaft of the rotor 3r. The terminals of the windings 3u, 3v, and 3w are connected to output terminals 4f, 4g, and 4h of the driving circuit 4, respectively.

The rotor 3r is disposed so as to face the top face of the substrate on which the driving circuit 4 is formed in the casing. Position sensors 10a, 10b, and 10c such as Hall sensors for detecting the magnetic pole position of the rotor 3r are attached on the substrate.

The driving circuit 4 includes, in addition to the position sensors 10a, 10b, and 10c, a filter circuit 11, an inverter circuit 12, and a one-ship IC (Integrated Circuit) 13 for control (corresponding to "control circuit"). In the driving circuit 4, the power source terminal 4a is connected to a positive power supply line 14 via a π type filter circuit 11 constructed by capacitors 11a and 11b and a reactor 11c, and the power source terminal 4b is connected to a negative power supply line 15.

The inverter circuit 12 has a configuration of a voltage source inverter circuit in which N-channel type MOSFETs 16 to 21 (corresponding to "switching devices") and flywheel diodes 22 to 27 are connected to each other in a three-phase bridge structure between the positive power supply line 14 and the negative power supply line 15. In the case of using the MOSFET as a switching device as shown in this embodiment, the flywheel diodes 22 to 27 are housed in the devices of the MOSFETs 16 to 21, respectively. The MOSFETs 16 to 18 and the flywheel diodes 22 to 24 construct an upper arm in a respective phase. The MOSFETs 19 to 21 and the flywheel diodes 25 to 27 construct a lower arm in the respective phase. Output terminals of U phase, V phase, and W phase are connected to the output terminals 4f, 4g, and 4h, respectively.

The filter circuit 11 is provided to suppress passage of a current flowing in the positive power supply line 14 and the negative power supply line 15 to the battery 7 via the power source terminals 4a and 4b in association with switching of the inverter circuit 12. Consequently, other devices connected to the battery 7 can be prevented from performing erroneously operation which is caused by switching noise of the inverter circuit 12.

Figure 2:
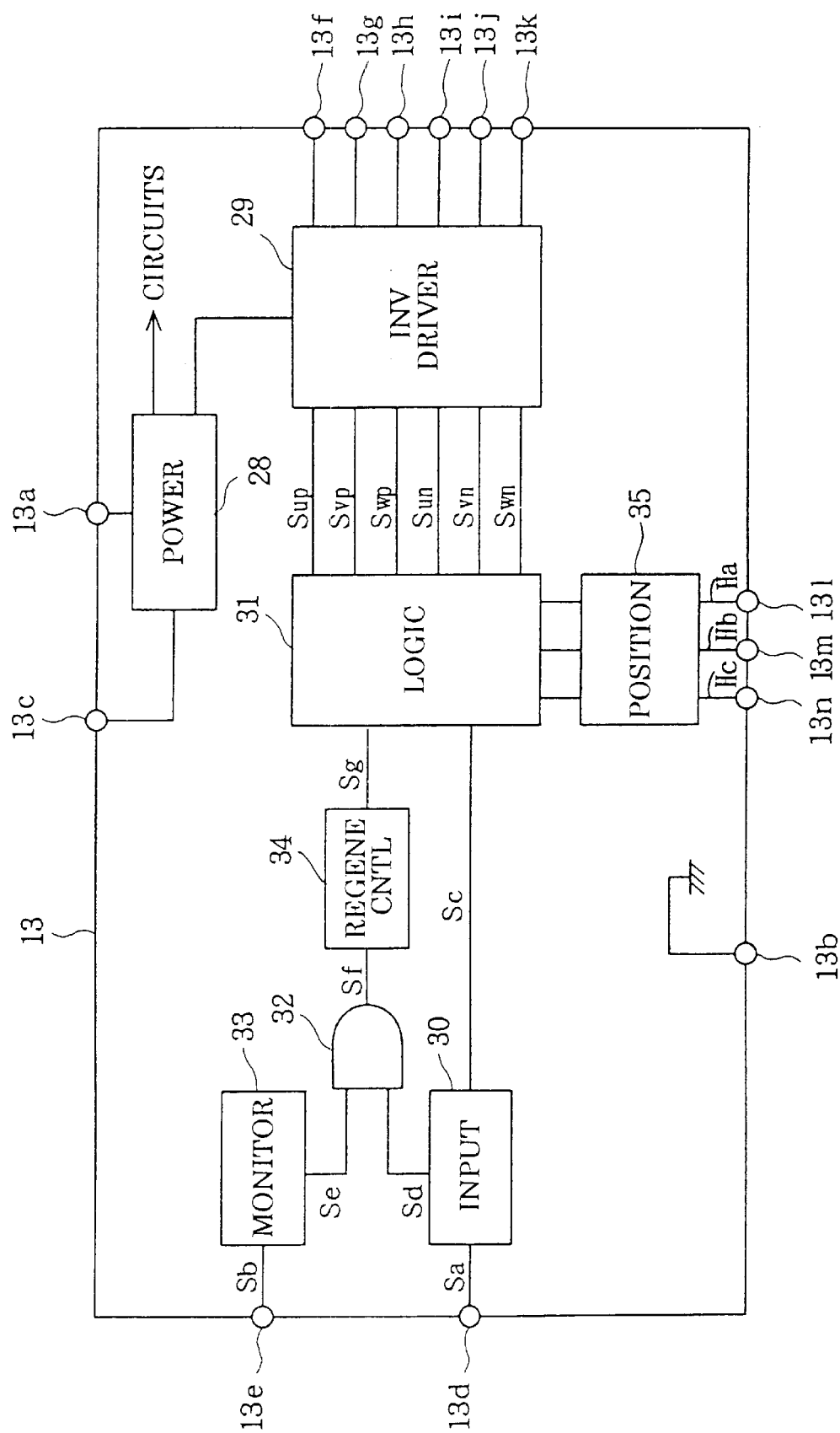
FIG. 2 is a block diagram showing the electric configuration of an IC 13.

Referring to FIGS. 2 and 1, terminals 13a and 13b of the IC 13 are power source terminals and are connected to the positive power supply line 14 and the negative power supply line 15, respectively. The IC 13 has a power source circuit 28. The power source circuit 28 supplies a power source voltage (for example, 12V) supplied from the battery 7 via the terminals 13a and 13b to circuits which will be described hereinafter, the source voltage is boosted by a booster such as a charge-pump circuit to, for example, 24V and the boosted voltage is applied to an inverter driving circuit 29 to be described hereinafter. The boosted voltage is used to drive the gates of the MOSFETs 16 to 18 on the upper arm side.

The power source circuit 28 has a standby function and receives the on/off state of an ignition switch 8 via a terminal 13c (and the input terminal 4c in the driving circuit 4 ). When the ignition switch 8 is in the off state, the power source circuit 28 cuts off the supply of the voltage to the circuits including the inverter driving circuit 29 to prevent a dark current (standby current) passing to the circuits.

Terminals 13d and 13e of the IC 13 are connected to input terminals 4d and 4e of the driving circuit 4, respectively. An input processing circuit 30 is an interface circuit for receiving a control signal Sa, converting the analog control signal Sa to a digital speed instruction signal Sc, and outputting the signal Sc to a computing circuit 31. When the control signal Sa is received from the engine control unit 9 (that is, when an instruction of driving the brushless motor 3 is given), the input processing circuit 30 outputs a low-level instruction state signal Sd to a logic circuit 32 for performing AND operation. When the control signal Sa is not received (in other words, when an instruction of driving the brushless motor 3 is not given), the H-level instruction state signal Sd is output to the logical circuit 32.

A monitoring circuit 33 is an interface circuit for receiving a charge state signal Sb. When the battery 7 is in the full charge state (when Sb is at the L level), the monitoring circuit 33 outputs a charge permit signal Se of the L level (indicative of inhibition) to the logical circuit 32. When the battery 7 is not in the full charge state (when Sb is at the H level), the monitoring circuit 33 outputs the charge permit signal Se of the H level (indicative of permission) to the logic circuit 32.

When both the instruction state signal Sd and the charge permit signal Se are at the H level, the logic circuit 32 outputs a regeneration permit signal Sf of the H level to a regeneration control circuit 34. In the other cases, the logic circuit 32 outputs the regeneration permit signal Sf of the L level. Only when the regeneration permit signal Sf is at the H level, the regeneration control circuit 34 outputs a regeneration control signal Sg of the H level for instructing regeneration of the energy by the brushless motor 3 to the computing circuit (logic circuit) 31.

When the speed instruction signal Sc is input (in this case, the regeneration control signal Sg is at the L level), the computing circuit 31 generates drive signals Sup, Svp, Swp, Sun, Svn, and Swn (corresponding to "drive signals") for rotating the brushless motor 3. When the H-level regeneration control signal Sg is input (in this case, the speed instruction signal Sc is not input), the computing circuit 31 generates drive signals Sup, Svp, Swp, Sun, Svn, and Swn (corresponding to "regenerative drive signals") for regenerating the power by the brushless motor 3. The drive signals Sup to Swn are supplied to the gates of the MOSFETs 16 to 21 constituting the inverter circuit 12 via the inverter driving circuit 29 and terminals 13f to 13k.

Position signals Ha, Hb, and Hc output from the position sensors 10a, 10b, and 10c are input to the IC 13 via terminals 13l, 13m, and 13n, respectively, and subjected to waveform shaping so as to be rectangular waves having predetermined voltage levels in a position detecting circuit 35 in the IC 13. After that, the resultant signals are input to the computing circuit 31. The computing circuit 31 corresponds to rotational speed detecting means and detects the rotational speed of the brushless motor 3 on the basis of the waveform-shaped position signals Ha, Hb, and Hc.

The action of the embodiment will now be described with reference to FIGS. 3 to 10.

Figure 3:
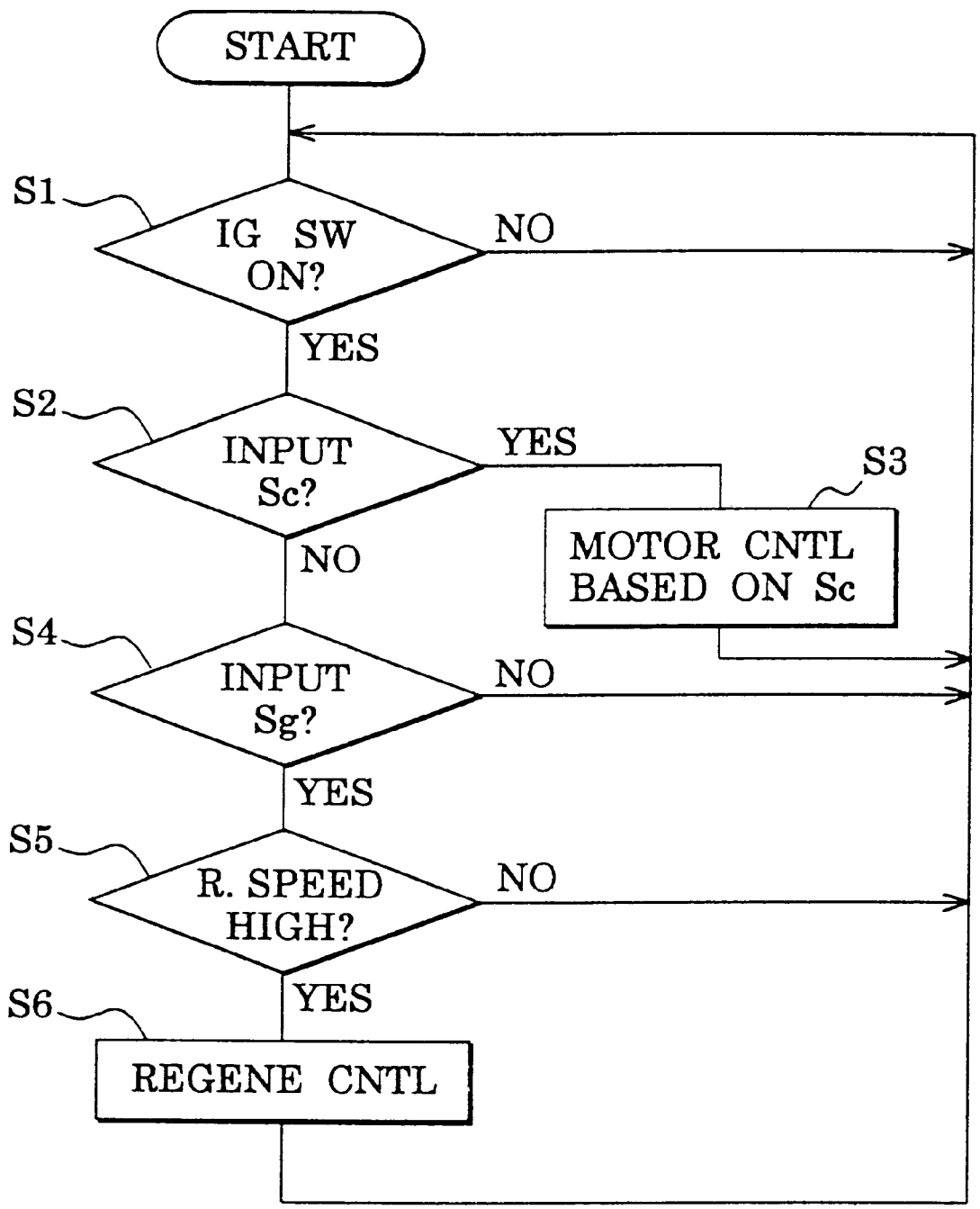
FIG. 3 is a flow chart of operations which are executed by the IC 13 as a hardware.

FIG. 3 is a flowchart showing the operations of the IC 13 constructed as hardware. Processes in steps are mainly performed in the circuits formed in the IC 13. The process in each step is executed by not software but hardware. The IC 13 may be mainly composed of a CPU. In this case, the CPU executes the processes shown in FIG. 3 in accordance with a control program stored in storing means (for example, ROM).

The power supply circuit 28 monitors whether the ignition switch 8 is ON or not as the standby function (step S1). The monitoring process may be always executed by the power supply circuit 28 independent of the steps described hereinafter. When the ignition switch 8 is not ON ("NO"), the power supply circuit 28 enters a standby state until the ignition switch 8 is turned on while the voltage supply to the circuits is cut off. On the contrary, when the ignition switch 8 is ON ("YES"), the power supply circuit 28 supplies a battery voltage to the circuits and supplies the boosted voltage to the inverter driving circuit 29, and the driving circuit 4 enters an operable state.

In this state, the computing circuit 31 monitors whether or not the speed instruction signal Sc has been input from the input processing circuit 30 or not, that is, whether or not the driving circuit 4 has received the control signal Sa from the engine control unit 9 (step S2). When the control signal Sa is received ("YES"), the computing circuit 31 drives the brushless motor 3 in accordance with the control signal Sa (speed instruction signal Sc) (step S3).

In this case, the computing circuit 31 detects the rotational speed of the brushless motor 3 on the basis of the position signals Ha, Hb, and Hc output from the position detecting circuit 35. The computing circuit 31 determines the duty ratio in a PWM control on the basis of a speed deviation as a difference between the detected rotational speed and the instructed rotational speed indicated by the speed instruction signal Sc and generates the drive signals Sup to Swn according to a 120° turn-on method. In the embodiment, the PWM control is executed on the MOSFETs 19 to 21 on the lower arm side.

Figure 4:
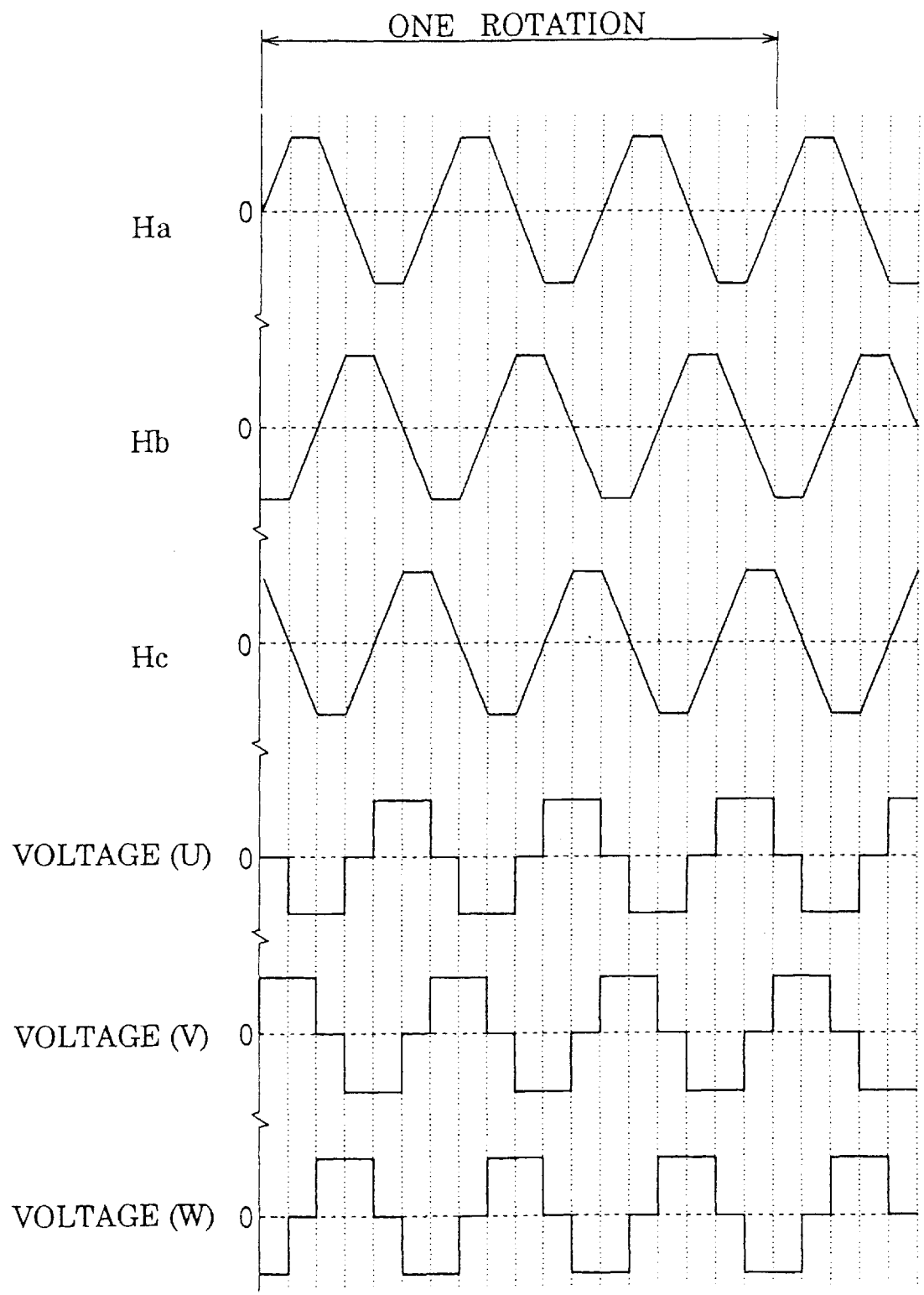
FIG. 4 is a waveform chart of position signals Ha, Hb, and Hc and motor application voltages when the motor is controlled.

FIG. 4 shows waveforms of the position signals Ha, Hb, and Hc output from the position sensors 10a, 10b, and 10c at the time of motor driving control and waveforms of voltages (PWM duty 100%) applied to the windings 3u, 3v, and 3w.

When the control signal Sa is not received in step S2 shown in FIG. 3 ("NO"), the computing circuit 31 monitors whether the H-level regeneration control Sg has been inputted from the regeneration control circuit 34 or not (step S4). The regeneration control signal Sg is set at the H level (charge permit) in a situation where the control signal Sa is not received from the engine control unit 9 and the charging state signal Sb of the H level (that is, indicating that the battery 7 is not in the full charge state) is received from the engine control unit 9. When the regeneration control signal Sg is at the L level ("NO"), the process in step S1 and subsequent processes are repeated.

As the vehicle travels, flowing air passes through the condenser 5 and the radiator 6, thereby cooling the condenser 5 and the radiator 6. When the flowing air comes into contact with the cooling fan 2, the cooling fan 2 is rotated and, accordingly, the rotor 3r of the brushless motor 3 rotates. As a result, the rotation energy (mechanical energy) of the cooling fan 2 by the flowing air is converted into the power generating energy (electric energy) of the brushless motor 3.

When the regeneration control signal Sg is at the H level ("YES" in step S4 ), the computing circuit 31 detects the rotational speed of the brushless motor 3 on the basis of the position signals Ha, Hb, and Hc, and monitors whether the detected rotational speed is equal to or higher than a predetermined value (step S5). When the detected rotational speed is equal to or higher than the predetermined value ("YES"), the computing circuit 31 executes a regenerating control for regenerating the power by the brushless motor 3 (step S6). When the detected rotational speed is lower than the predetermined value ("NO"), the process in step S1 and subsequent processes are repeated.

The reason why the regenerating control is executed only when the rotational speed of the brushless motor 3 is equal to or higher than the predetermined value is that, since the electric power is required to execute the regenerating control itself, if the regenerating circuit is executed in a low rotational speed state in which sufficient regenerative energy is not obtained, the power consumption of the fan controlling apparatus 1 increases after all.

Concretely, the computing circuit 31 executes the regenerating control as follows. The computing circuit 31 generates the drive signals Sup to Swn for turning off all the MOSFETs 16 to 18 on the upper arm side and turning on/off the MOSFETs 19 to 21 on the lower arm side by the same switching signal having a predetermined frequency and a predetermined duty ratio.

When the MOSFETs on the lower arm side are turned on in a state where the brushless motor 3 rotates, via the MOSFETs on the lower arm side of a phase according the position of the rotor 3r (hereinafter, called a specific phase), a current is passed to the winding of the specific phase by an inductive voltage of the brushless motor 3. After that, when the MOSFETs 19 to 21 are turned off, the flywheel diode on the upper arm side of the specific phase is turned on, and the current passed to the winding of the specific phase flows in the battery 7 via the flywheel diode, positive-side power source line 14, and filter circuit 11. That is, the boosted voltage chopping operation using the windings 3u, 3v, and 3w of the brushless motor 3 and the regenerating operation are simultaneously performed. The generated energy is supplied from the brushless motor 3 to the battery 7. Consequently, the battery 7 is charged up again, that is, the electric energy of the battery 7 is renewed.

Subsequently, a test result of the regenerating control will be described.

Figure 5:
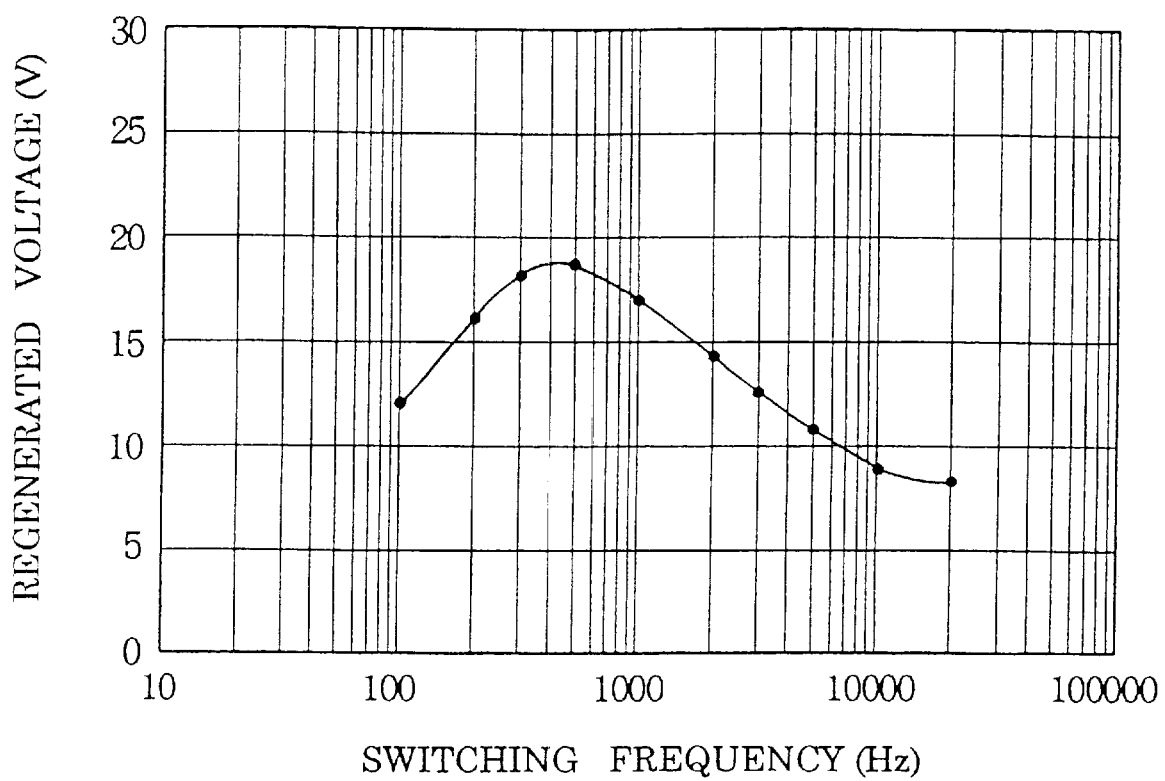
FIG. 5 is a graph showing a relation between lower arm switching frequency and a regenerative voltage in a regenerative control test.
Figure 6A:
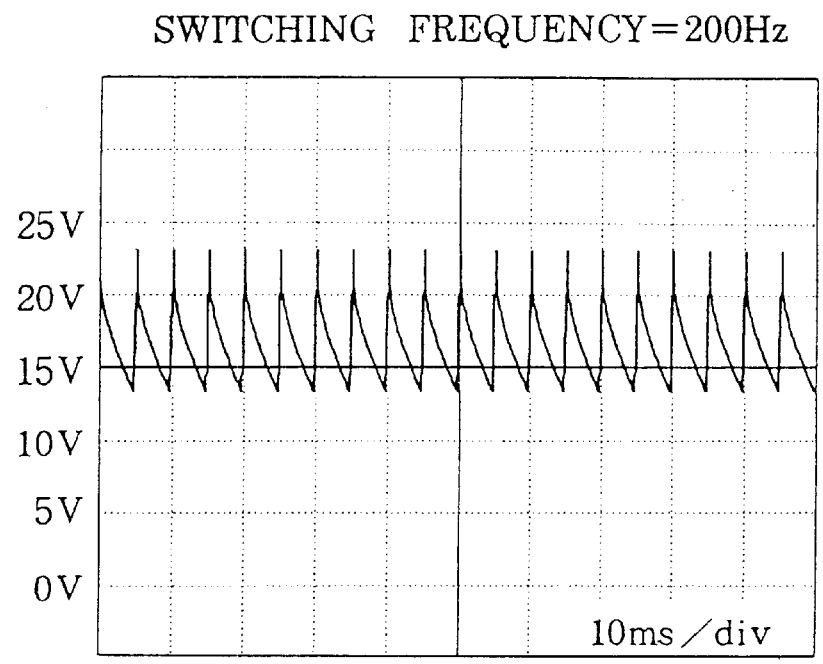
FIGS. 6A and 6B are waveform charts of a regenerative voltage in the regenerative control test.
Figure 6B:
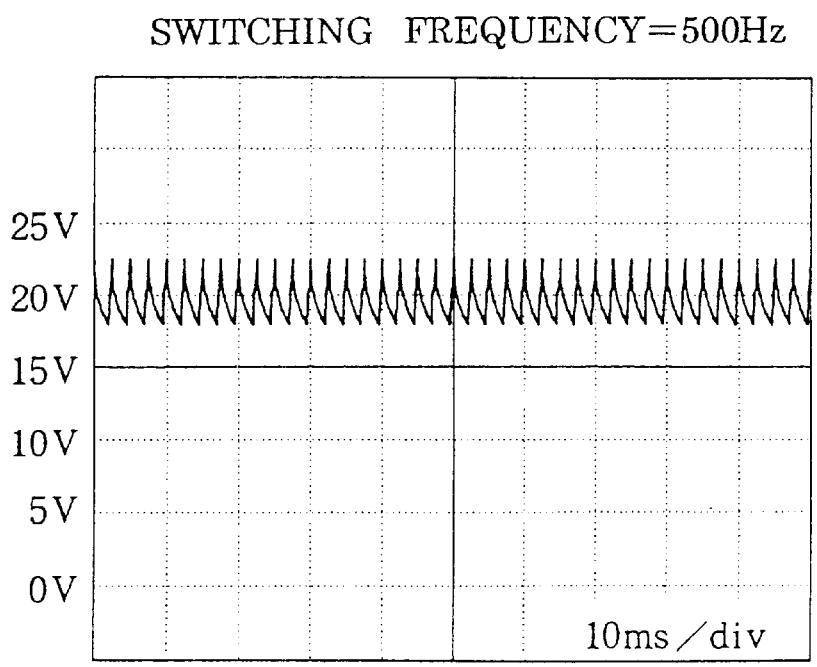
Figure 7:
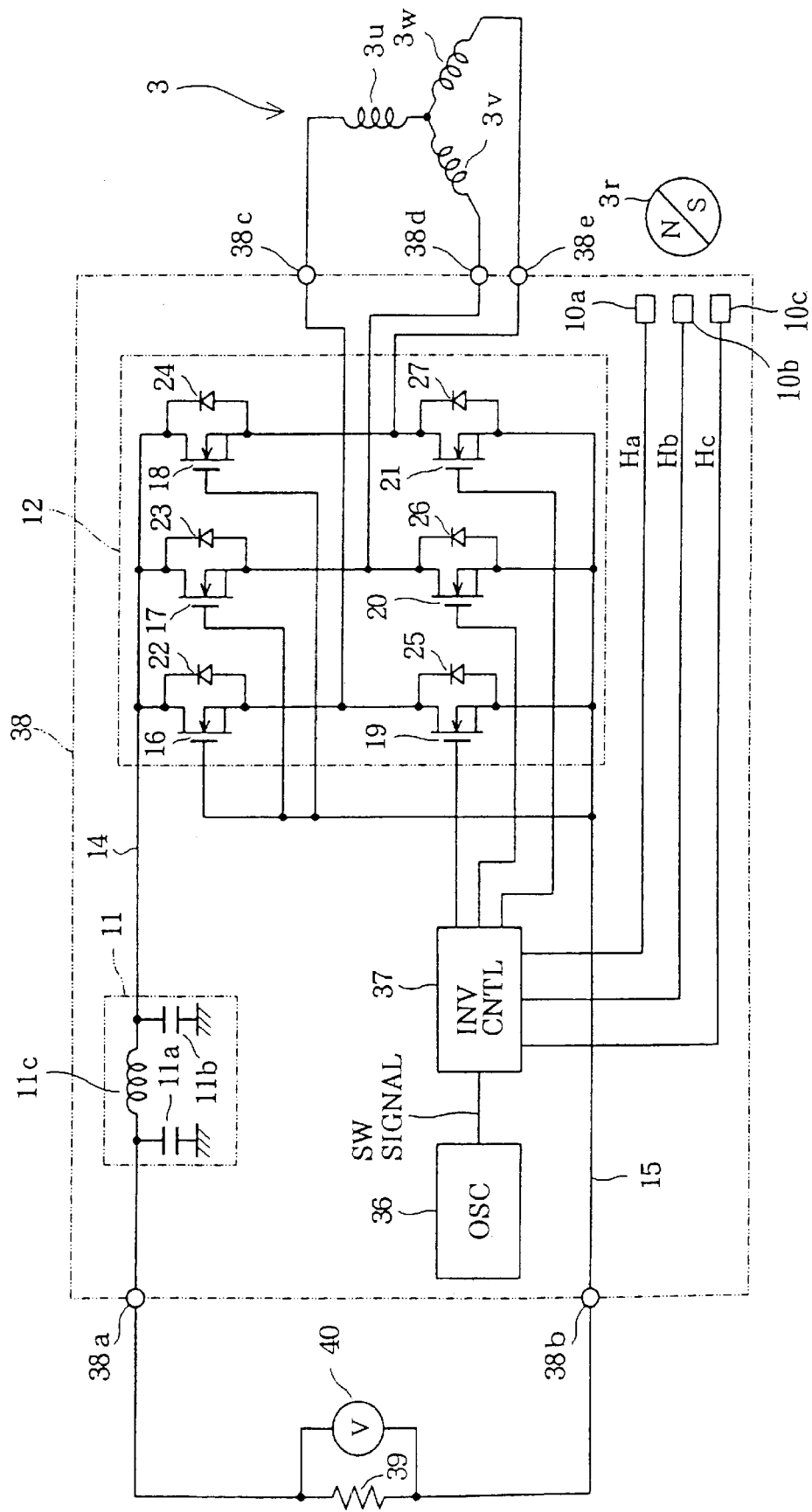
FIG. 7 is a diagram showing an electric configuration of a regenerative control test circuit.

FIG. 5 and FIGS. 6A and 6B show results of tests of the regenerating control performed by using a test circuit illustrated in FIG. 7. FIG. 5 shows a relationship between switching frequency and regenerative voltage. FIGS. 6A and 6B show waveforms of regenerative voltages at switching frequencies of 200 Hz and 500 Hz, respectively.

The test circuit shown in FIG. 7 has a regenerative circuit 38 including the position sensors 10a, 10b, and 10c, filter circuit 11, inverter circuit 12, an oscillating circuit 36, and an inverter control circuit 37, a resistor 39 (having a resistance value of 30Ω) and a voltmeter 40 are connected in parallel between terminals 38a and 38b, and the windings 3u, 3v, and 3w of the brushless motor 3 are connected to terminals 38c, 38d, and 38e.

In the inverter circuit 12, the gates of the MOSFETS 16 to 18 on the upper arm side are connected to the terminal 38b, and the MOSFETs 16 to 18 are always in the OFF state. A common switching signal having a square waveform outputted from the oscillating circuit 36 is supplied to each of the gates of the MOSFETs 19 to 21 on the lower arm side via the inverter control circuit 37. The position signals Ha, Hb, and Hc are inputted to the inverter control circuit 37. The brushless motor 3 is forcedly rotated by a not-illustrated motor.

| A test was conducted with the following parameters (A). | |
|---|---|
| duty ratio of switching signal: | 50% |
| rotational speed of brushless motor 3: | 1500 rpm |
| rated power of brushless motor 3: | 240 W |
| inductance of windings 3u to 3w: | 73 μH |

Figure 10:
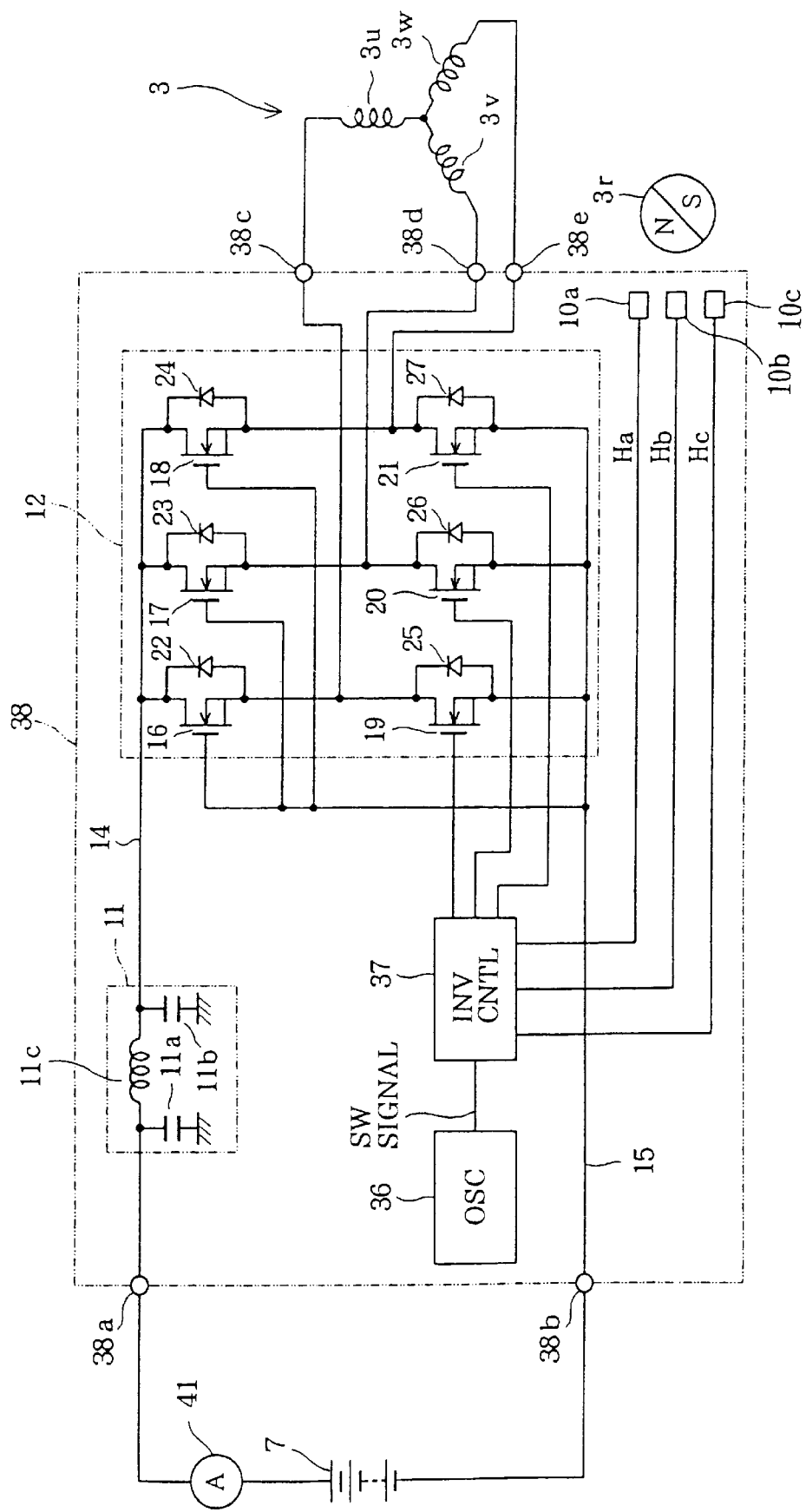
FIG. 10 is a diagram showing a modification of the diagram shown in FIG. 7.

It is found from a result of the test that, as shown in FIG. 5, the regenerative voltage (difference electric potential between both ends of the resistor 39) becomes a maximum value when the switching frequency of the MOSFETs 19 to 21 is around 500 Hz. In a test (using a test circuit as shown in FIG. 10) in which the battery 7 is connected in place of the resistor 39, a charging current for the battery 7 became the maximum when the switching frequency was around 500 Hz. With the parameters (A), therefore, by setting the switching frequency to a value around 500 Hz, the regenerating efficiency becomes the maximum. The switching frequency causing the maximum efficiency changes according to the specification of the brushless motor 3, for example, inductance values of the windings 3u to 3w.

In FIGS. 6A and 6B showing regenerative voltage waveforms, when the MOSFETs 19 to 21 on the lower arm side change from the ON state to the OFF state, a regenerative current passed to the resistor 39 sharply increases. After that, the regenerative current gradually decreases according to a time constant of the inductance of the windings 3u to 3w and the resistor 39 and a time constant of the capacitors 11a and 11b (400 μF), the reactor 11c (20 μm), and the resistor 39.

When the MOSFETs 19 to 21 are switched in an audio frequency band, a magnetic sound is generated from the brushless motor 3. The magnetic sound varies according to a switching frequency. Although the magnetic sound is usually masked with an engine sound, in the case where the noise becomes an issue, by setting the switching frequency to around 200 Hz (in the case of the embodiment), the noise can be made not easily heard. Alternately, the fan controlling apparatus 1 may have a measure for sound isolation.

Figure 8:
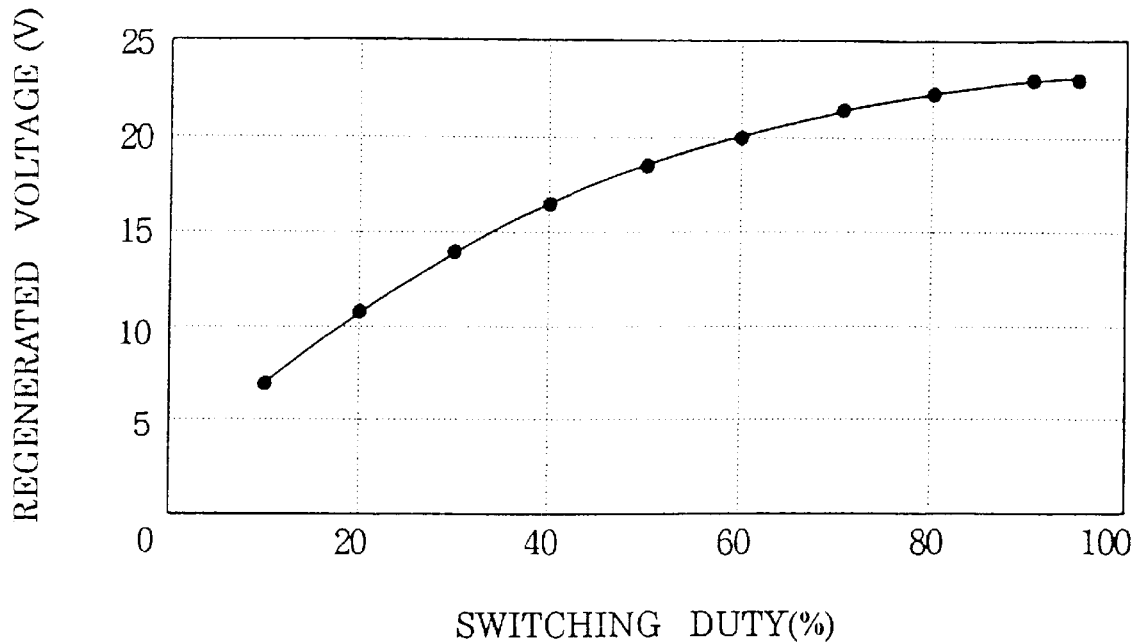
FIG. 8 is a graph showing an relation between a duty ratio of a lower arm switching signal and a regenerative voltage in the regenerative control test.

Further, FIG. 8 shows a relationsip between the duty ratio of the switching signal and the regenerative voltage in a test of regenerative control conducted by using the test circuit illustrated in FIG. 7.

| The test was conducted with the following parameters (B). | |
|---|---|
| switching frequency: | 500 Hz |
| rotational speed of brushless motor 3: | 1500 rpm |
| rated power of brushless motor 3: | 240 W |
| inductance of windings 3u to 3w: | 73 μH |

It is found from a result of the test that the regenerative voltage increases as the duty ratio of the switching signal is higher (except for values around 100%). For example, when the duty ratio is set to a value around 90%, as compared with the case where the duty ratio is set to 50%, the regenerative voltage increases by about 30%.

Figure 9:
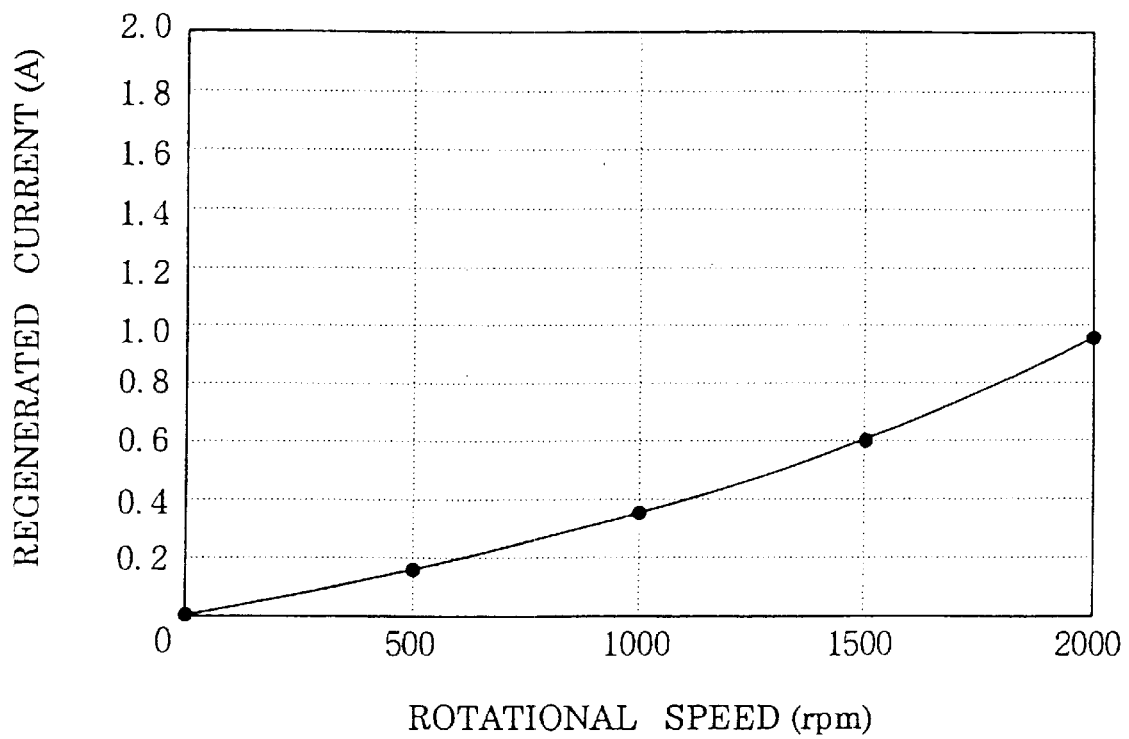
FIG. 9 is a diagram showing a relation between a rotational speed of a brushless motor and a regenerative current in the regenerative control test.

FIG. 9 shows a relationsip between the rotational speed of the brushless motor 3 and the regenerative circuit (average value) in a test of the regenerative control executed by using a test circuit illustrated in FIG. 10. The test circuit shown in FIG. 10 has a configuration in which the battery 7 (of 12V) and a voltmeter 41 are connected in series in place of the resistor 39 and the voltmeter 40 in the test circuit shown in FIG. 7.

| The test was conducted with the following parameters (C). | |
|---|---|
| switching frequency: | 500 Hz |
| duty ratio of switching signal: | 50% |
| rated power of brushless motor 3: | 240 W |
| inductance of windings 3u to 3w: | 73 μH |

It is found from a result of the test that as the rotational speed of the brushless motor 3 increases, the regenerative current (charging current of the battery 7) increases. As an example, when the vehicle travels at 80 km/h, the rotational speed of the cooling fan obtained by the flowing air is 1500 rpm, and the battery 7 is charged with the current of 0.6A as an average.

As described above, the fan controlling apparatus 1 of the embodiment is constructed so that the cooling fan 2 for a vehicle is rotated by the brushless motor 3. Consequently, different from the configuration in which the fan is driven by the engine, the cooling fan 2 can be driven and stopped and the rotational speed can be set without depending on the engine rotating state. While preventing occurrence of excessive or insufficient cooling, the condenser 3 and the radiator 6 can be optimally cooled.

The embodiment is characterized in that when the driving circuit 4 for driving the brushless motor 3 does not receive the control signal Sa as a drive instruction from the engine control unit 9 and the cooling fan 2 is rotated by the flowing air in the situation where the battery 7 is not in the fully charged state, the energy generated by the brushless motor 3 is stored in the battery 7. Thus, an improved balance between the generated power and the consumed power in the vehicle can be achieved.

Particularly, different from a device receiving natural wind, as the vehicle travels, the flowing air passes at high speed. The cooling fan 2 which receives the flowing air at high speed rotates at high speed, so that high energy can be regenerated by the brushless motor 3. In this case, the generated energy is charged in the battery 7 to regenerate energy thereof. Even if the rotational speed of the cooling fan 2 changes according to the driving state of the vehicle, the regenerated energy can be effectively used. The regenerative control can also prevent the battery 7 from being excessively charged.

Since the driving circuit 4 performs the regenerative control so that the energy in the battery 7 is regenerated only under the above-described regenerative condition and only when the rotational speed of the brushless motor 3 is equal to or higher than a predetermined value. The predetermined value in this case is set to the rotational speed at which energy at least higher than the energy consumed by the regenerative control can be generated. Consequently, useless regenerative control is not performed when the vehicle stops or travels at low speed, so that effectively improved power balance in the vehicle is achieved, and the period of generating the magnetic sound in association with the regenerative control can be shortened.

By operating the inverter circuit 12 as a boosted voltage chopping circuit by using the windings 3u, 3v, and 3w of the brushless motor 3, while boosting an inductive voltage generated in association with the rotation of the brushless motor 3, the energy is charged to the battery 7. Even when the rotational speed is low, the battery 7 can be therefore charged.

As the configuration for regenerating the energy of the battery 7, the circuit configuration inherently required to drive the brushless motor 3, for example, the inverter circuit 12, the power supply circuit 28 in the IC 13, the inverter driving circuit 29, and the position detecting process circuit 35 can be used without any modification. The system of the conventional configuration can be easily changed to the system of the present embodiment.

Further, since the brushless motor 3 having motor efficiency higher than that of a DC motor with a brush is employed, the power saving is achieved and the improved power balance is attained. The power supply circuit 28 in the IC 13 has the dark current interrupting function of interrupting the voltage supplied to the circuits when the ignition switch 8 is in the off state. Consequently, even when the vehicle is not used for a long period, the battery is not easily dead.

The invention is not limited to the above-described embodiment shown in the drawings but can be modified or expanded as follows, for example.

Although the fan controlling apparatus 1 of the embodiment is constructed so that the driving circuit 4 for driving the brushless motor 3 can also perform the regenerative control, separately from the driving circuit for driving the brushless motor 3, a regenerative apparatus for regenerating the energy by the brushless motor 3 may be provided. In this case, it is sufficient for the regenerative apparatus to execute the regenerative control in a manner similar to the foregoing embodiment.

The motor is not limited to the brushless motor but, for example, a DC motor (with a brush) may be used. The vehicle is not limited to an automobile.

While the present invention has been shown and described with reference to the foregoing preferred embodiment, it will be apparent to those skilled in the art that changes in form and detail may be therein without departing from the scope of the invention as defined in the appended claims.

What is claimed is:

1. An apparatus for controlling a cooling fan for a vehicle, comprising:
    a motor for rotating a cooling fan for a vehicle; and
    a regenerative apparatus for regenerating electrical energy through the motor in association with rotation of the cooling fan when the cooling fan is rotated by flowing air,
    wherein the regenerative apparatus comprises rotational speed detecting means for detecting rotational speed of the motor, and
    the regenerative apparatus regenerates the energy through the motor when the rotational speed detected by the rotational speed detecting means is equal to or higher than a predetermined value, while the regenerative apparatus does not regenerate the energy through the motor when the rotational speed detected by the rotational speed detecting means is lower than the predetermined value.

2. The apparatus for controlling the cooling fan for a vehicle according to claim 1, further comprising power storing means capable of storing the electric power,
    wherein the regenerative apparatus stores electric energy generated by the motor into the power storing means in a situation that the power storing means is in a non-full stored state.

3. An apparatus for controlling a cooling fan for a vehicle, comprising:
    a motor for rotating a cooling fan for a vehicle; and
    a driving apparatus for driving the motor to rotate the cooling fan, wherein:
        the driving apparatus is constructed to regenerate electrical energy through the motor during rotation of the cooling fan for a vehicle when the cooling fan is rotated by flowing air when the motor is in a non-driven state,
        the driving apparatus has rotational speed detecting means for detecting rotational speed of the motor, and
        the electric energy is regenerated through the motor when the rotational speed detected by the rotational speed detecting means is equal to or higher than a predetermined value, while the electrical energy is not regenerated by the motor when the rotational speed detected by the rotational speed detecting means is lower than a predetermined value.

4. The apparatus for controlling the cooling fan for a vehicle according to claim 3, further comprising power storing means capable of storing electric power, wherein the driving apparatus stores energy generated by the motor into the power storing means under the condition that the power storing means is in a non-full stored state.

5. The apparatus for controlling the cooling fan for a vehicle according to claim 4, wherein the motor is a brushless motor.

6. The apparatus for controlling the cooling fan for a vehicle according to claim 5, wherein the driving apparatus comprises:

an inverter circuit constructed by a switching device for switching an application of power to the brushless motor; and a control circuit for outputting either a drive signal for driving the brushless motor or a regenerative drive signal for regenerating the electric energy by the brushless motor to the switching device.

7. An apparatus for controlling a vehicle cooling fan, comprising:

a brushless motor for rotating the vehicle cooling fan; and a driving apparatus for driving the brushless motor to rotate the vehicle cooling fan, wherein the driving apparatus is constructed to regenerate electrical energy by the brushless motor in association with rotation of the vehicle cooling fan when the cooling fan is rotated by flowing air when the brushless motor is in a non-driven state, the driving apparatus has rotational speed detecting means for detecting rotational speed of the brushless motor, an inverter circuit including a switching device for selectively switching power to the brushless motor; and a control circuit for outputting either a drive signal for driving the brushless motor or a regenerative drive signal for regenerating the electrical energy through the brushless motor to the switching device, wherein the electrical energy is regenerated through the brushless motor when the rotational speed detected by the rotational speed detecting means is equal to or higher than a predetermined value, while the electric energy is not regenerated by the brushless motor when the rotational speed detected by the rotational speed detecting means is lower than the predetermined value, the inverter circuit is a bridge circuit comprising a switching device constituting an upper arm and a switching device on a lower arm, and the control circuit supplies, as the regenerative drive signal, an off signal to the switching device constituting the upper arm and a switching signal having a predetermined frequency and a predetermined duty ratio to the switching device constituting the lower arm.

8. The apparatus for controlling a cooling fan for a vehicle according to claim 7, further comprising power storing means capable of storing electrical power, wherein the driving apparatus stores energy generated through the motor into the power storing means when the power storing means is not at full capacity.

9. The apparatus for controlling the cooling fan for a vehicle according to claim 7, wherein the driving apparatus comprises:

an inverter circuit constructed by a switching device for selectively switching power to the brushless motor; and a control circuit for outputting either a drive signal for driving the brushless motor or a regenerative drive signal for regenerating the electrical energy through the brushless motor to the switching device.

10. A regenerative apparatus for controlling an electrical motor of a cooling fan to operate as a generator, comprising:

a computing circuit for calculating a rotational speed of the cooling fan; and a driving circuit for driving the electrical motor to rotate the cooling fan and for generating electrical energy through the electrical motor in association with rotation of the cooling fan when the cooling fan is rotated by flowing air when the electrical motor is in a non-driven state;

wherein the driving circuit is controlled for generating electrical energy when the rotational speed calculated by the computing circuit is equal to or higher than a predetermined value, while the driving circuit is not controlled for generating electrical energy when the rotational speed calculated by the computing circuit is lower than the predetermined value.

* * * * *